(12) United States Patent
Rudduck et al.

(10) Patent No.: US 9,186,760 B2
(45) Date of Patent: Nov. 17, 2015

(54) ASSEMBLY AND DISASSEMBLY METHOD, SYSTEM, AND COMPONENT

(75) Inventors: Dickory Rudduck, Chicago, IL (US); John Ker Wilson, Winnetka, IL (US)

(73) Assignee: Telezygology, Inc., Chicago, IL (US)

( * ) Notice: Subject to any disclaimer, the term of this patent is extended or adjusted under 35 U.S.C. 154(b) by 1167 days.

(21) Appl. No.: 10/556,662

(22) PCT Filed: May 13, 2004

(86) PCT No.: PCT/AU2004/000623
§ 371 (c)(1),
(2), (4) Date: Nov. 11, 2005

(87) PCT Pub. No.: WO2004/101216
PCT Pub. Date: Nov. 25, 2004

(65) Prior Publication Data
US 2006/0272141 A1     Dec. 7, 2006

(30) Foreign Application Priority Data

May 13, 2003   (AU) ................. 2003902259

(51) Int. Cl.
*B23P 11/00*       (2006.01)
*B23P 19/04*       (2006.01)
*G05B 19/418*      (2006.01)

(52) U.S. Cl.
CPC ........... *B23P 19/04* (2013.01); *G05B 19/41805* (2013.01); *G05B 2219/31031* (2013.01);
(Continued)

(58) Field of Classification Search
CPC .............................................. Y10T 29/53039
USPC ......... 29/407.04, 407.05, 407.09, 407.1, 705; 29/707, 709, 712, 720, 428, 429, 468; 411/1
See application file for complete search history.

(56) References Cited

U.S. PATENT DOCUMENTS 4,453,303 A   6/1984 Leddet
4,574,490 A * 3/1986 Curchod ............... 33/203.18
(Continued)

FOREIGN PATENT DOCUMENTS

DE    19510856 A1   9/1996
EP    1088626 A2    4/2001
(Continued)

OTHER PUBLICATIONS

Interactive Technolgoies, Inc., Recessed Mount Door/Window Sensor, Aug. 1998, pp. 1-4.*
(Continued)

*Primary Examiner* — Alexander P Taousakis
(74) *Attorney, Agent, or Firm* — Heather A. Kartsounes (57) ABSTRACT

The invention deals with methods for assembly and disassembly, especially suitable for assembly and disassembly by a computer. In relation to assembly, a component (10) is positioned in assembly (70) in accordance with a proposed position. The composent (10) is confirmed as being in its correct spatial position in the assembly (70) by sensing means (38) or (46) capable of sensing spatial relationship and/or connection of the component (10) in relation to the assembly (70). Information regarding the sensed spatial relationship and/or connection is communicated to information processing means. A method for disassembly is also disclosed. The assembly and disassembly methods may require steps to be taken in a chosen sequence. The component (10) itself is also described, as is an improved assembly system which includes the component (10) together with information processing means.

3 Claims, 11 Drawing Sheets

(52) U.S. Cl.
CPC ............... *G05B2219/31034* (2013.01); *G05B 2219/31065* (2013.01); *Y10T 29/4978* (2015.01); *Y10T 29/49778* (2015.01); *Y10T 29/53022* (2015.01)

(56) References Cited

U.S. PATENT DOCUMENTS

| | | | |
|---|---|---|---|
| 4,575,931 A | 3/1986 | Jonca | |
| 4,603,329 A | 7/1986 | Bangerter et al. | |
| 4,654,964 A | 4/1987 | Schneider | |
| 4,675,993 A | 6/1987 | Harada | |
| 4,731,923 A | 3/1988 | Yagi et al. | |
| 4,823,606 A * | 4/1989 | Malicki | 73/761 |
| 5,129,753 A | 7/1992 | Wesley et al. | |
| 5,160,233 A | 11/1992 | McKinnis | |
| 5,212,751 A | 5/1993 | Brownjohn | |
| 5,239,739 A | 8/1993 | Akeel et al. | |
| 5,244,372 A * | 9/1993 | Ramsey et al. | 425/135 |
| 5,248,233 A | 9/1993 | Webster | |
| 5,283,943 A | 2/1994 | Aguayo | |
| 5,291,789 A * | 3/1994 | Walton | 73/761 |
| 5,331,831 A | 7/1994 | Schneider | |
| 5,361,130 A * | 11/1994 | Kersey et al. | 356/478 |
| 5,451,772 A * | 9/1995 | Narendran | 250/227.19 |
| 5,493,390 A * | 2/1996 | Varasi et al. | 356/32 |
| 5,510,709 A * | 4/1996 | Hurley et al. | 324/242 |
| 5,531,009 A | 7/1996 | Givler | |
| 5,539,713 A * | 7/1996 | Ido et al. | 369/30.32 |
| 5,723,857 A * | 3/1998 | Underwood et al. | 250/227.14 |
| 5,771,578 A | 6/1998 | King et al. | |
| 5,877,426 A * | 3/1999 | Hay et al. | 73/733 |
| 5,930,881 A * | 8/1999 | Naruse et al. | 29/407.08 |
| 5,945,665 A * | 8/1999 | Hay | 250/227.14 |
| 6,081,993 A * | 7/2000 | Rankin | 29/756 |
| 6,141,867 A | 11/2000 | Fukada et al. | |
| 6,147,622 A * | 11/2000 | Fonea | 340/5.2 |
| 6,161,032 A * | 12/2000 | Acker | 600/424 |
| 6,287,039 B1 | 9/2001 | Leconte et al. | |
| 6,450,064 B1 | 9/2002 | Christiansen et al. | |
| 6,530,718 B2 | 3/2003 | Nygren et al. | |
| 6,539,755 B1 * | 4/2003 | Bruwer et al. | 70/107 |
| 6,591,668 B1 * | 7/2003 | Becherer et al. | 73/146 |
| 6,671,185 B2 * | 12/2003 | Duval | 361/807 |
| 6,735,856 B1 | 5/2004 | Kitamura et al. | |
| 6,760,211 B2 | 7/2004 | Bueno Ruiz et al. | |
| 6,769,830 B1 | 8/2004 | Nygren | |
| 6,780,042 B1 | 8/2004 | Badescu et al. | |
| 6,941,645 B2 * | 9/2005 | Kosuge et al. | 29/714 |
| 7,027,672 B2 * | 4/2006 | Tjin | 385/13 |
| 7,062,831 B2 * | 6/2006 | Walt et al. | 29/407.02 |
| 7,134,175 B2 * | 11/2006 | Flick | 29/407.09 |
| 7,195,033 B2 * | 3/2007 | Mayeu et al. | 137/554 |
| 7,300,432 B2 * | 11/2007 | Surma et al. | 606/1 |
| 7,409,754 B2 * | 8/2008 | Park | 29/33 K |
| 7,528,598 B2 * | 5/2009 | Goldfine et al. | 324/240 |
| 7,587,803 B2 * | 9/2009 | Montfort et al. | 29/407.1 |
| 7,628,079 B2 * | 12/2009 | Sato et al. | 73/761 |
| 7,766,547 B2 * | 8/2010 | Weppenaar et al. | 374/208 |
| 8,433,160 B2 * | 4/2013 | Shah et al. | 385/12 |
| 2002/0102130 A1 | 8/2002 | Nygren et al. | |
| 2002/0137390 A1 | 9/2002 | Jarvis | |
| 2003/0135995 A1 * | 7/2003 | Glasson | 29/832 |
| 2004/0124662 A1 | 7/2004 | Cleland et al. | 296/146.4 |
| 2004/0150516 A1 * | 8/2004 | Faetanini | 340/444 |
| 2004/0172879 A1 * | 9/2004 | Regnet et al. | 49/26 |
| 2004/0247386 A1 | 12/2004 | Sugiyama et al. | |
| 2005/0238418 A1 * | 10/2005 | Surma et al. | 403/24 |
| 2006/0055178 A1 * | 3/2006 | Graute | 292/216 |
| 2010/0070127 A1 * | 3/2010 | Heider et al. | 701/30 |
| 2012/0167700 A1 * | 7/2012 | Santos et al. | 73/866.5 |
| 2013/0186951 A1 * | 7/2013 | Zhu et al. | 235/375 |

FOREIGN PATENT DOCUMENTS

| | | |
|---|---|---|
| JP | 11074693 A | 3/1999 |
| JP | 11239925 A | 9/1999 |

OTHER PUBLICATIONS

Translation of EP1088626.*

* cited by examiner

ASSEMBLY AND DISASSEMBLY METHOD, SYSTEM, AND COMPONENT

TECHNICAL FIELD

This invention relates to improved assembly and disassembly. The practical focus on the invention is on an improved system for use in conjunction with computer assembly and disassembly. However, the scope of the invention is not necessarily limited to this situation.

BACKGROUND ART

Assembly is a process of joining components, often in an ordered sequence and dictated by a known set of steps. Likewise, disassembly often requires an ordered sequence.

Traditionally, the art of assembly or disassembly depends on a procedure or plan. In the simplest form, the assembly plan may be in the memory of a human assembler. Slightly more complex assemblies may require written instructions. More sophisticated assembly may require a detailed formal protocol, with each step in the assembly mapped out in detail, and using computer programs to control robotic installation.

Whether the assembly is simple, complex or sophisticated, and whether the assembled article is a simple toy, a piece of furniture or an automotive vehicle, for example, it is required that the components and sub-assemblies are in the correct spatial position and have the correct position relative to other components, sub-assemblies and to the assembly itself.

DISCLOSURE OF THE INVENTION

It is an object of the present invention to facilitate assembly and/or disassembly and preferably to facilitate one or more of the following:
(a) control of assembly and/or disassembly by computer program;
(b) understanding of the relationship between the components;
(c) control of servicing by computer program;
(d) control of inventory;
(e) quality assurance; and
(f) provision of alternate pathways to assembly and/or disassembly.

In a first aspect, this invention provides a method for assembling a component in an assembly, the method including the steps of:
positioning the component in the assembly in accordance with a proposed position in the assembly,
sensing that the component is in its correct spatial position in the assembly by use of sensing means capable of sensing spatial relationship and/or connection of the component in relation to the assembly; and
communicating information regarding the sensed spatial relationship and/or connection to information processing means.

In a second aspect, this invention provides a method for disassembling a component from an assembly, the method including the steps of:
removing the component from its position in the assembly;
sensing that the component has been removed from its position in the assembly using sensing means capable of sensing spatial relationship and/or connection of the component in relation to the assembly; and
communicating information regarding the sensed spatial relationship and/or connection to information processing means.

In a third aspect, this invention provides a method for assembling a component in an assembly in a chosen sequence, the method including the steps of:
selecting or identifying the component;
comparing the selected or identified component with information which correlates that component with sequence of assembly;
positioning the component in the assembly in accordance with the sequence of assembly;
sensing that the component is in its correct spatial position in the assembly by use of sensing means capable of sensing spatial relationship and/or connection of the component in relation to the assembly; and
communicating information regarding the sensed spatial relationship and/or connection to information processing means.

In a fourth aspect, this invention provides a method for disassembling a component from an assembly in a chosen sequence, the method including the steps of:
selecting or identifying the component;
comparing the selected or identified component with information which correlates that component with sequence of disassembly;
removing the component from the assembly in accordance with the sequence of disassembly;
sensing that the component has been removed from the assembly using sensing means capable of sensing spatial relationship and/or connection of the component in relation to the assembly; and
communicating information regarding the sensed spatial relationship and/or connection to information processing means.

Further, this invention provides a component for an assembly, the component being associated with:
a sensing means capable of sensing spatial relationship and/or connection of the component in relation to the assembly; and
means for communicating information regarding the sensed spatial relationship and/or connection of the component to information processing means.

This invention also provides an improved assembly system which includes:
the component of the invention; and
information processing means for processing information communicated by the communication means.

The various aspects of the invention may be suitable for a wide range of uses, ranging from simple to complex to sophisticated systems. Preferably, however, the invention is used for complex or sophisticated assemblies.

The assembly may be of any suitable type. Mentioned by way of example are building assemblies (including doors, windows, walls, etc), automotive vehicle assemblies and vehicle sub-assemblies, such as sound system installations, and aerospace assemblies. These are merely a small sample of the wide range of assemblies for which the invention may be suitable.

The sensing means may be associated with every component in the assembly or with one or some only of those components. The sensing means may be chosen from any suitable sensing means. Some non-limiting examples are Hall Effect sensors, microswitches, optical fibre connections, optical sensors, capacitance detectors, radio frequency identification, proximity switches, electronic strain gauges and magnetic proximity detectors. By way of another example, the sensing means may involve a contact switch, i.e. connection of the component to an earthed circuit when the component is in place in the assembly. Movement of the component out of place (to a selected extent) can break the earth connection and signal lack of displacement, removal or improper positioning.

The sensing means may have more than one function. It may also form part of a fastener, to fasten the component to the assembly. The fastener may be a fastener disclosed by any of the following patent applications, the contents of which are imported herein by reference: International Patent Application No. PCT/AU99/00185 (Fixing and Release Systems), International Patent Application No. PCT/AU03/00759 (Further Improvements in Fixing and Release Systems), International Patent Application No. PCT/AU03/00933 (Improvements in Assembly and Disassembly), International Patent Application No. PCT/AU03/001539 (Bolt Assembly) and International Patent Application No. PCT/AU2004/000371 (Fastener for Air Bags and Other Uses).

There may be more that one sensing means per component. In this case, one sensing means may have the same or a different function from another. For example, a component having a square perimeter may have a first sensing means for sensing proximity of a corner of the component to the assembly. A second sensing means may sense proximity of an edge of the perimeter, not being located at a corner, to the assembly.

In addition to the spatial position/connection sensing means, the invention may include sensing means for other purposes, or the spatial position/connection sensing means may be capable of sensing other information in addition to spatial position/connection. For example, it may be desirable to sense the presence or absence of another component or element. It may be desirable to sense the identity of a component, so that it can be detected whether the component is a genuine component or not. It may be desirable to sense whether fasteners are locked or unlocked. These functions may be carried out by the sensing means in the method, system and component of the invention or by separate sensors.

The sensing means may sense the spatial relationship of the component to an element in the assembly or proposed assembly. The element may be another component in the assembly or it may be something else, for example something related to the environment in which the assembly is to be inserted or used. As an example, if the assembly is to be placed in a frame or contained in a casing, the element may be all or a portion of that frame or casing.

The communication means may be any suitable means. Preferably, the communication means involves a computerised network.

The communications means may involve electrical, data and/or optical connections at relevant positions on the components of the assembly. Networking may involve hard wiring or wireless connection, using any suitable method.

The information processing means is preferably a computer which translates the information received via the communication means into a user-friendly form which is capable of display on the information display means (if present). The information display means is preferably a screen of suitable type, such as a liquid crystal display (LCD) screen, for example. The information display means is preferably included when the invention is intended for use by humans.

Identification of a component may be desirable for some aspects of the invention. Identification means may include a serial number, a bar code, a radio frequency identification or any other suitable means.

As indicated above, the invention has wide applicability. An example of how the system of the invention can be employed is briefly described below in connection with the drawings, some of which are based on drawings in International Patent Application No. PCT/AU03/00759.

BRIEF DESCRIPTION OF THE DRAWINGS

The invention will be further illustrated by reference to the accompanying drawings. The drawings show, inter alia, how the components in an assembly can relate to each other and how they can be assembled in two different forms to result in different types of assembly. The embodiments in the drawings are not limiting on the scope of the invention.

In the accompanying drawings.

DETAILED DESCRIPTION OF THE DRAWINGS

Figure 1:
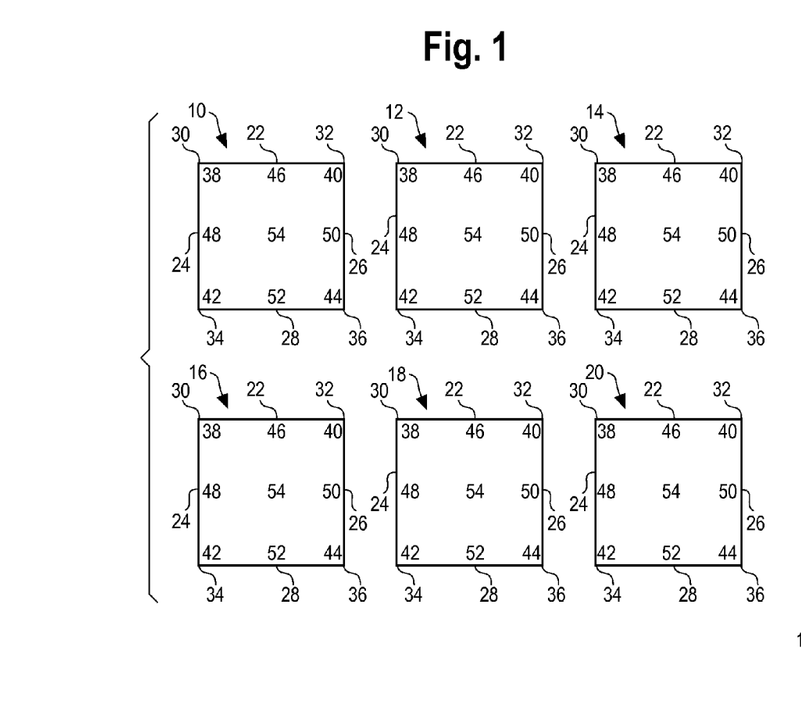
FIG. 1 shows in plan view six different components, which happen to be identical in this drawing.

Referring first to FIG. 1, there are shown six components 10, 12, 14, 16, 18 and 20. Each has a square perimeter with four sides 22, 24, 26 and 28 and four corners 30, 32, 34 and 36.

Each component 10, 12, 14, 16, 18 and 20 has sensing means 38, 40, 42 and 44, one located at each of corners 30, 32, 34 and 36, respectively. Each component 10 (etc.) also has edge sensors 46, 48, 50 and 52, located approximately in the centre of each of sides 22, 24, 26 and 28 respectively.

Located approximately in the centre of each component 10 (etc.) is a component identification means 54, 56, 58, 60, 62 and 64 respectively to identify each component.

Figure 2:
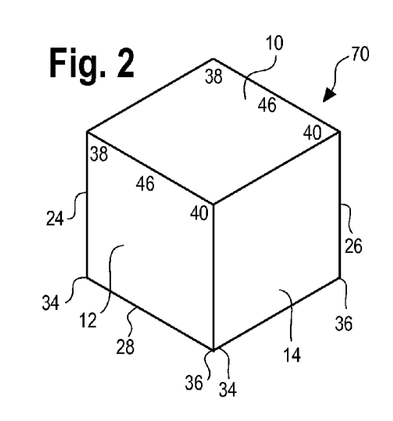
FIG. 2 shows in perspective view an assembly formed by the components in FIG. 1, the assembly in this case being a cube.

Using a first computer program, components 10, 12, 14, 16, 18 and 20 are assembled to form an assembly, cube 70 shown in FIG. 2. The computer (not shown) recognises the identity of each component 10 (etc.) through an identification sensor which sends an enquiry to the identification means 54 (etc.). The computer compares the identity of the component 10 (etc.) with its data base which links identity with proposed position in the assembly 70. The components 10 (etc.) are positioned manually or robotically to the correct position in accordance with identity. The computer uses information relayed by the edge sensors 46, 48, 50 and 52 and corner sensor 38, 40, 42 and 44 to ensure that the components 10 (etc.) are assembled in the desired configuration and with the desired tolerance of snug fit.

The identification means 54 (etc.) may be any suitable identification means. A non-limiting example is a serial number or a barcode. This may be a unique number or code which is programmed into the component as part of the manufacturing process.

It is to be appreciated that, although in the drawings the components are shown as being identical, they may in fact have special characteristics in use. For instance, component 12 may be a wall with windows, component 14 may be a wall with a door and component 10 may be a ceiling or roof, so that cube 70, as shown in FIG. 2, forms a house.

Figure 3:
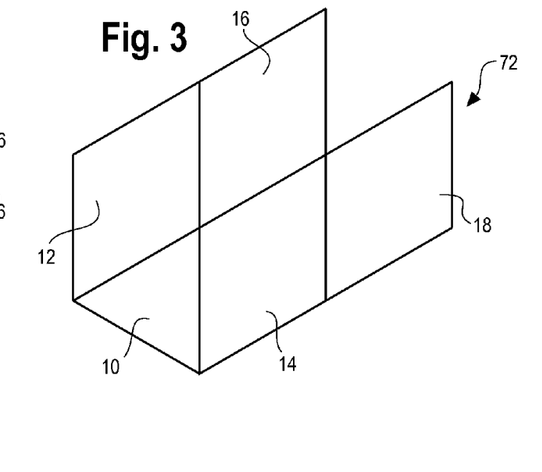
FIG. 3 shows the same six components of FIG. 1 after forming into a different assembly, being a channel.

Components 10, 12, 14, 16, 18 and 20 may be used to form a different assembly, being channel 72, shown in FIG. 3. Once again, the computer, using a different program, identifies each individual component 10 (etc.) and employs the edge sensor 46 (etc.) and the corner sensors 38 (etc.) in order to construct the desired assembly 72.

Because of the information conveyed by the edge sensors 46 (etc.) and the corner sensors 38 (etc.), in the case of either the first or second program, the program can be designed so that the components 10 (etc.) are assembled in a strict hierarchy or sequence. The relationship of the assembly to an outside element, such as a street when the assembly 70 in FIG. 2 is a house, may also be determined. This can be easily understood if one refers to the example where the assembly 70 in FIG. 2 is a house. During assembly, component 20 is first laid down to form a floor, then components 12, 14, 16 and 18 are erected to form vertical walls. Component 10 cannot be attached as the roof until components 12, 14, 16 and 18 are properly in place on floor 20. The assembly 70 is constructed so that component 14 is closest to the street (not shown) and so that component 14 is parallel to the street.

Figures 4, 5:
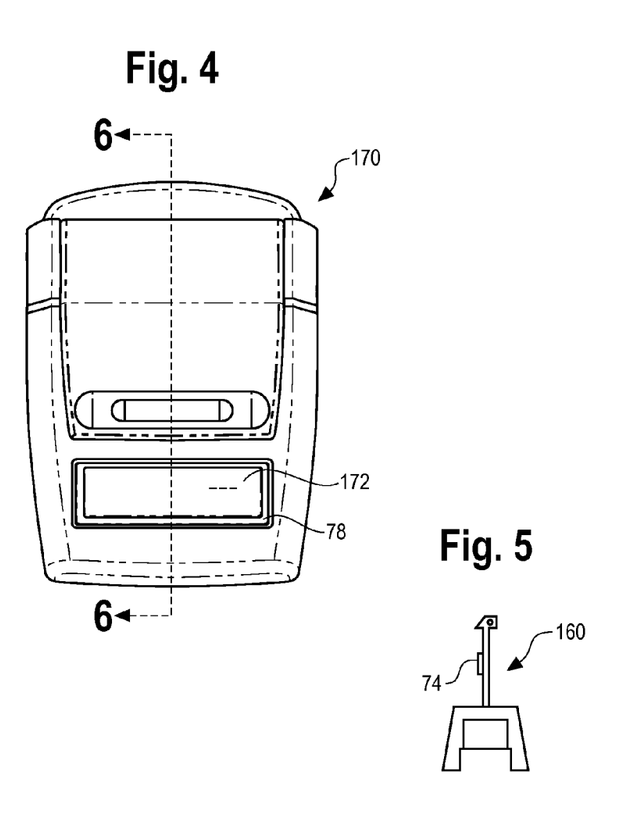
FIG. 4 is a front elevation of an assembly being a vehicle dashboard facia.
FIG. 5 is a side elevation of a fastener including sensing means.
Figure 6:
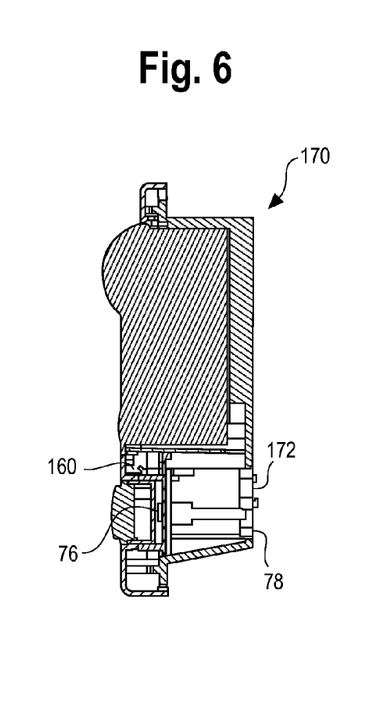
FIG. 6 is a cross-sectional view of the facia of FIG. 4, taken along the lines 6-6 in FIG. 4.

Referring now to FIGS. 4, 5 and 6, the vehicle dashboard 170 in FIGS. 4 and 6 contains a radio 172 held in facia 170 by one or more overhang fasteners 160 (refer FIG. 5). One such overhang fastener 160 is just discernible in FIG. 6 and is quite small. Fastener 160 is not easily accessible from the outside of vehicle dashboard 170. Fastener 160 can be addressed via a microprocessor or connection to a circuit board (not shown) and can be activated so as to release radio 172 from its position in fascia 170.

Fastener 160 includes sensor 74 which senses whether fastener 160 is in the locked or unlocked position. As can be seen from FIG. 6, dashboard assembly 170 includes component engagement sensor 76, for sensing whether the component, in this case radio 172, is in correct spatial position or is properly engaged in vehicle dashboard 170.

Figure 7:
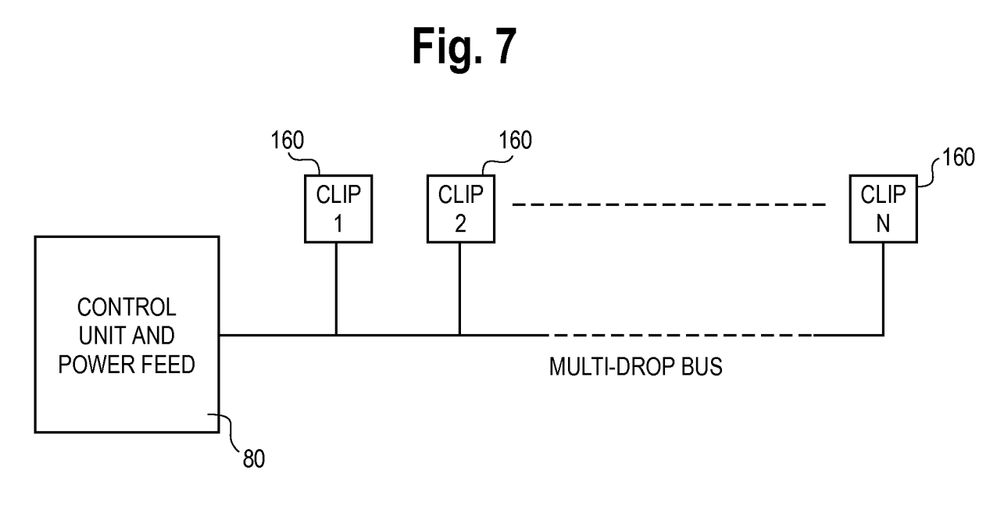
FIG. 7 is a schematic diagram showing a plurality of the fasteners of FIG. 5 connected by a multi-drop communications and power feed bus and controlled by a common control unit.

A plurality of fasteners 160 may be involved in retaining radio 172 in position in dashboard 170. The plurality of fasteners are individually addressable and may be connected by a multi-drop communications and power feed bus in the configuration shown conceptually in FIG. 7. Any suitable number (n) of fasteners 160 may be integrated in this configuration, which is controlled by a common control unit and power feed 80.

Figure 8:
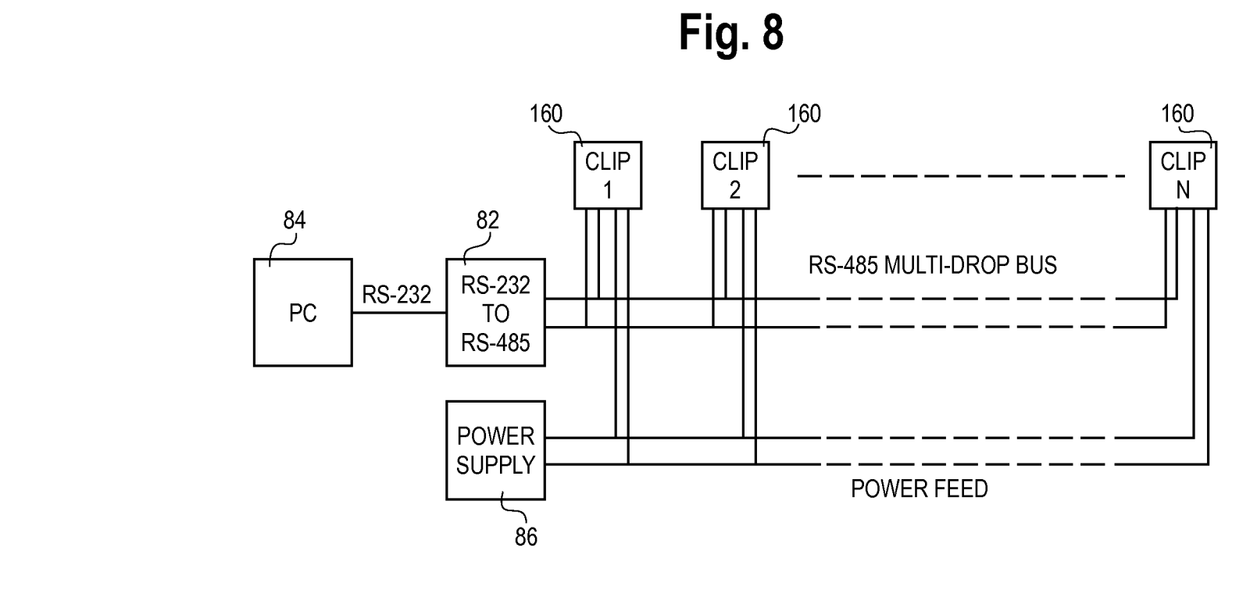
FIG. 8 is a schematic diagram which is an alternate to that in FIG. 7, showing a plurality of the fasteners of FIG. 5 connected by a multi-drop RS-485 network and separate power feed bus and controlled by a computer via a RS-232 to RS-485 converter.

As a variation, as shown in FIG. 8, fastener 160, again being individually addressable, may be connected by a multi-drop network 82 controlled by a computer 84, with a separate power supply 86.

A vehicle dashboard 170 such as that represented in FIGS. 4 and 6 may be designed so that the components can be assembled or disassembled only by use of a computer program. In order to remove and replace radio 172, intelligent fasteners 160 are instructed to release so that the radio 172 can be removed and replaced. On dashboard 170 may be a trim facing 78 which must be removed before radio 72 can be removed. The trim facing 78 may be secured by more fasteners 160. In applying the method of the present invention, the computer program involved in the disassembly receives information as to whether trim facing 78 has been removed or not. For this purpose, magnetic proximity sensors (not shown) are arranged around the perimeter of trim facing 78, either integrated with fasteners 160 or as separate devices. The proximity sensors convey information as to the proximity of each part of trim facing 78 to dashboard 170. The information is conveyed using the computer network and processed by the computer before being displayed on a screen for the computer operator.

When the new radio 172 is installed and the trim facing 78 is reassembled, the computer program can check for correct spatial position of all components, including trim facing 78. If the new radio 172 includes identification means and if an identity sensor is included, the program can also check to see if a genuine replacement component has been used and report on that aspect.

Figure 9:
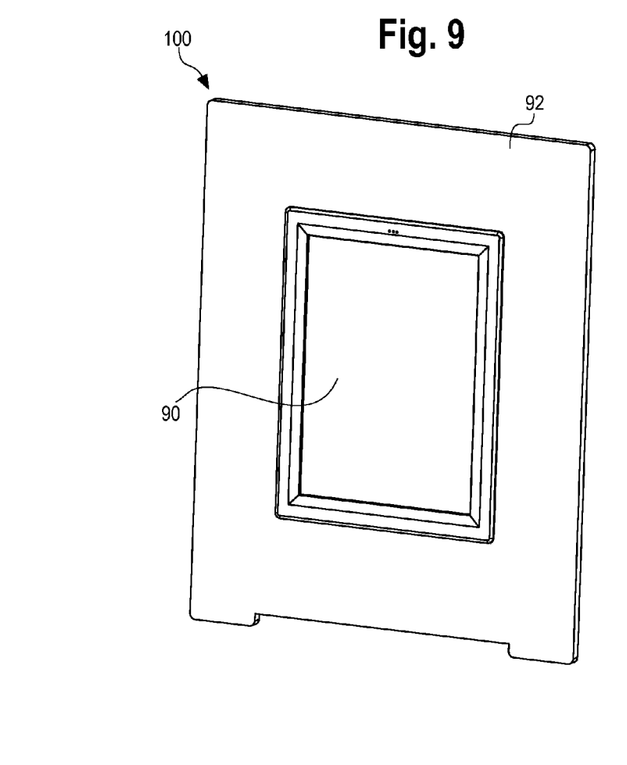
FIG. 9 is a front perspective view of an assembly being an aircraft instrumentation panel.
Figure 10:
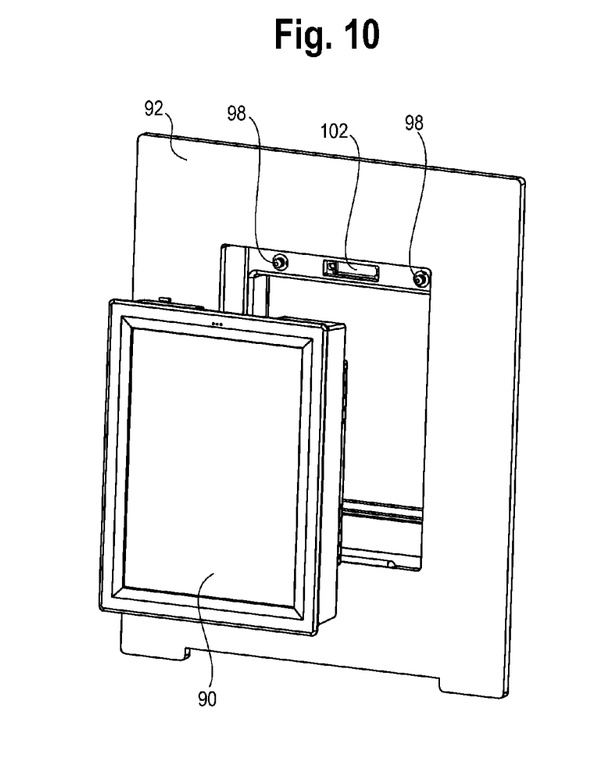
FIG. 10 shows the assembly of FIG. 9 with an instrument released from the panel.
Figure 11:
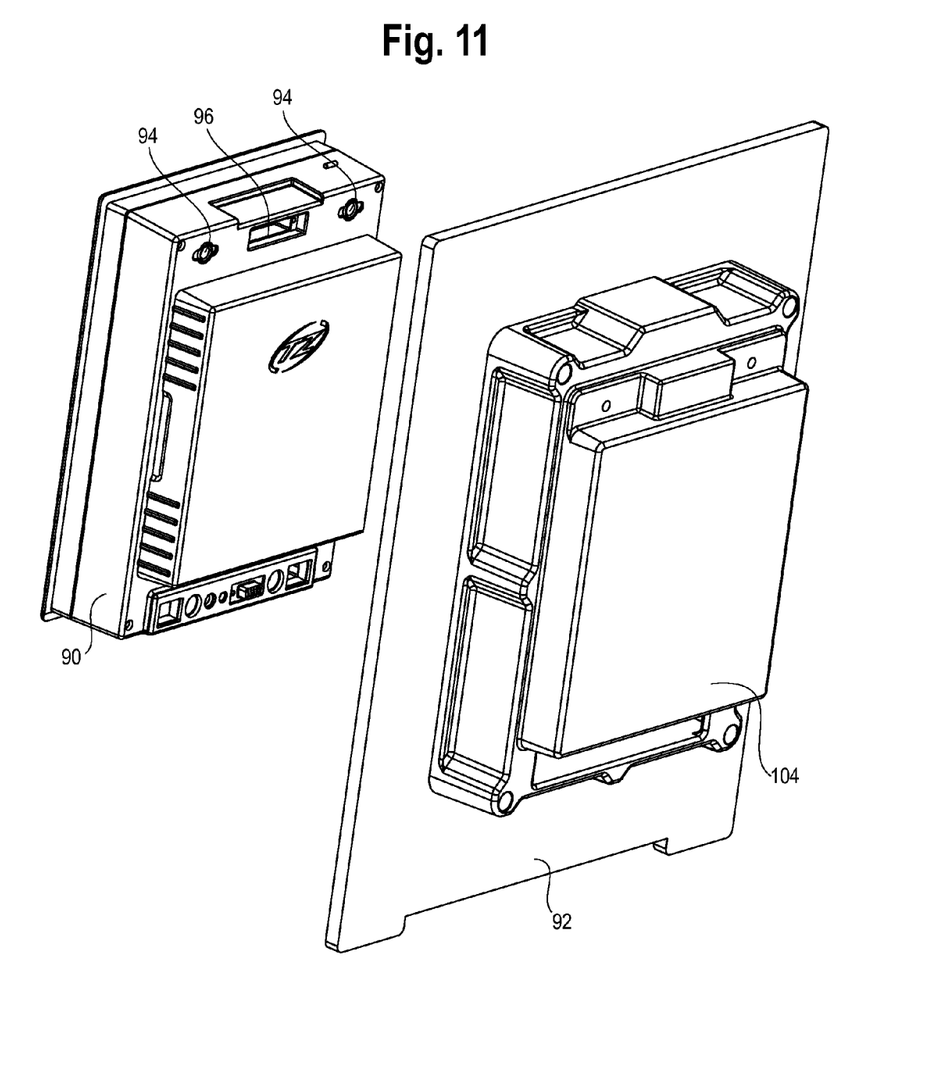
FIG. 11 is a rear perspective view of the released assembly of FIG. 10.

Reference is now made to FIGS. 9 to 11. Assembly 100 has a component being instrumentation panel 90 and a component being panel housing 92. Instrumentation panel 90 includes various instruments (not shown) for the aircraft. Instrumentation panel 90 includes at least two fasteners 94 and a sensor 96 (refer FIG. 11) for sensing whether or not instrumentation panel 90 is engaged with panel housing 92. Panel housing 92 includes fastener pegs 98 (refer FIG. 10) for engagement in fasteners 94, as well as sensor 102, to sense whether instrumentation panel 90 is engaged with panel housing 92. Sensors 96 and 102 may together form sensing means in accordance with the invention to sense connection between panel housing 92 and instrumentation panel 90. Sensing may be by completion of an electrical circuit, or by use of a reed switch or other suitable means.

Although FIGS. 10 and 11 show fastener peg 98 on panel housing 92 and fastener 94 as forming part of instrumentation panel 90, these components may be reversed. However, it may be more convenient to include fasteners 94 on instrumentation panel 90 since they may be connected to the electrical circuitry in instrumentation panel 90.

As will be seen from FIG. 11, panel housing 92 includes moulded panel receptacle 104, for snugly receiving instrumentation panel 90.

Fastener 94 is shown in more detail in FIGS. 12 to 15. The ring clip fastener 94 illustrated in these Figures is particularly suitable for securing components to a panel as in FIGS. 9 to 11. Fastener 94 is shown in the locked state in FIGS. 12 and 13 as engaging fastener peg 98 and in FIGS. 14 and 15 after release of fastener peg 98.

Figure 12:
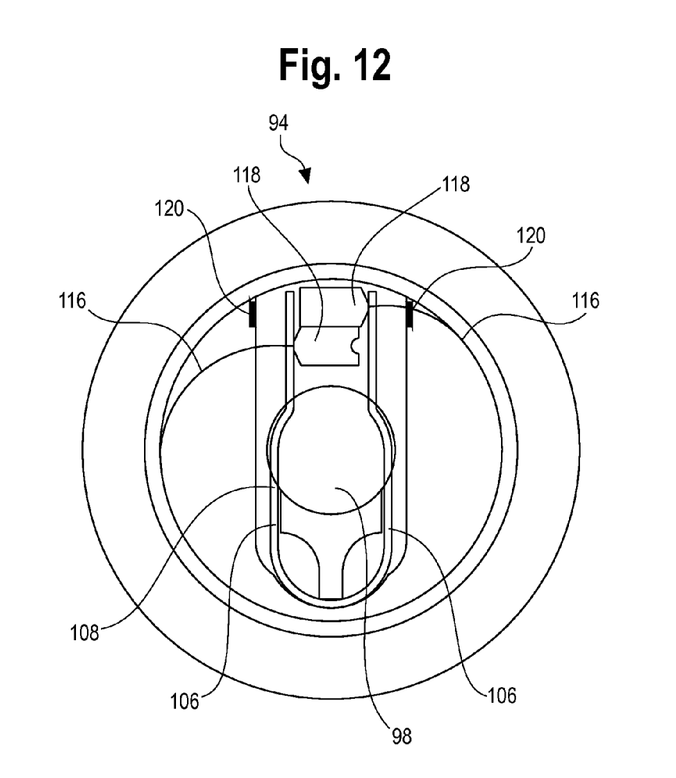
FIG. 12 is a top plan view of a ring clip fastener in the locked state, suitable for use with the aircraft instrumentation panel of FIGS. 9 to 11.
Figure 13:
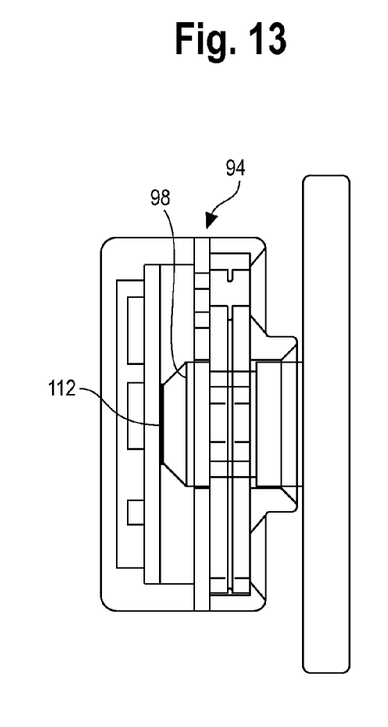
FIG. 13 is a side sectional view of the ring clip fastener of FIG. 12, in the locked state.

Fastener peg 98 includes groove 104. When peg 98 is pushed into fastener 94, arms 106 of bias spring 108 are pushed apart by ramp 110 on peg 98. Arms 106 snap fit into groove 104 to lock peg 98 in fastener 94. Thus instrumentation panel 90 can be mounted in panel housing 92 by simple manual pressure.

Included in fastener 94 is engagement sensor 112 which senses contact with base 114 of peg 98. Engagement sensor 112 confirms engagement of peg 98 in fastener 94 and can communicate that information to a computer (not shown).

As can be seen from FIG. 12, fastener 94 includes a shape memory alloy (SMA) wire 116. As has been described in the patent specifications imported herein by reference, a shape memory alloy wire can be configured so that it contracts when activated. In the case of fastener 94, the shape memory alloy wire 116 is connected to terminals 118 which bear on arms 106 of bias spring 108.

Figure 14:
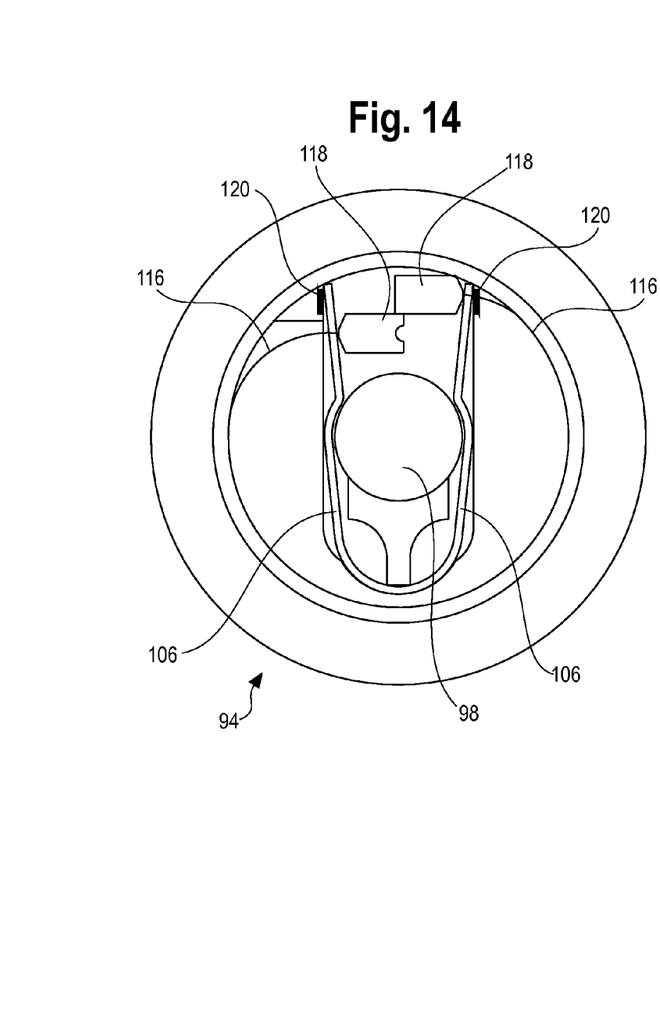
FIG. 14 is a top plan view of the fastener of FIGS. 12 and 13, but in the unlocked state.
Figure 15:
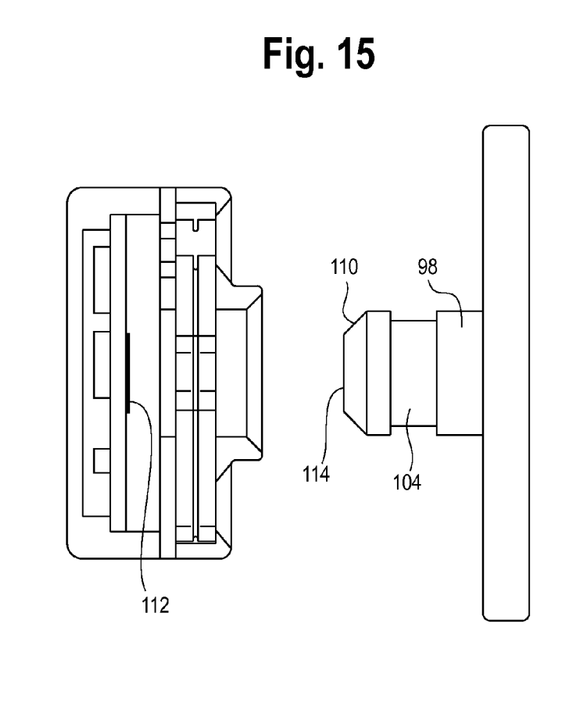
FIG. 15 is a cross-sectional view of the ring clip fastener of FIG. 14 in the unlocked state and is useful for comparison with FIG. 13.
Figure 16:
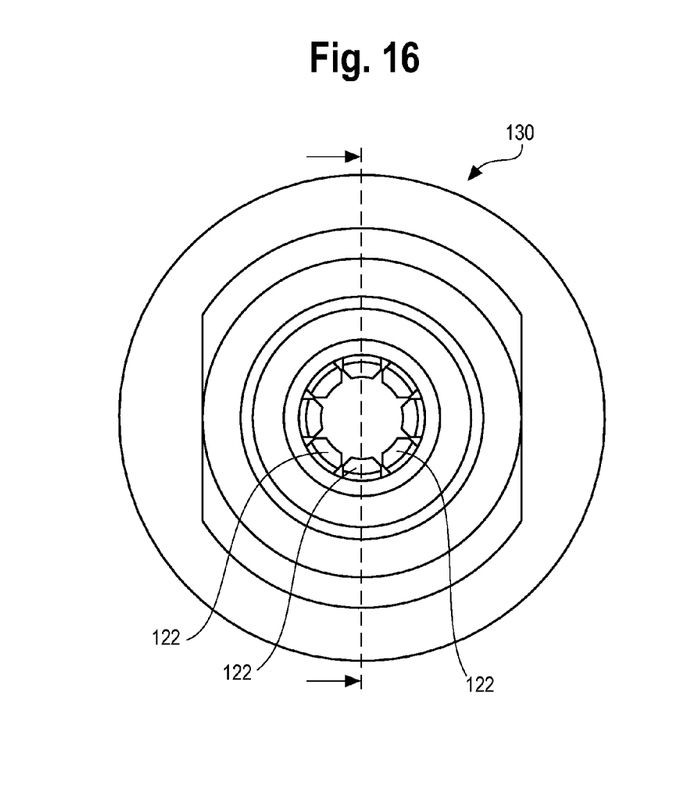
FIG. 16 is a top plan view of an alternate fastener which could be used in the assembly of FIG. 9.

When appropriate energy is applied to SMA wire 116—for example, electrical energy—and SMA wire 116 is heated to the necessary temperature, SMA wire 116 contracts as shown in FIG. 14. Contraction of SMA wire 116 causes terminals 118 to move apart. Because terminals 118 bear on arms 106, those arms 106 are forced apart. Arms 106 move out of groove 104, permitting release of peg 98. Engagement sensor 112 can report on the release of peg 98.

Included in fastener 94 are sensors 120 which sense the locked status of fastener 94. When fastener 94 is in the unlocked state as shown in FIG. 14, it will be seen that arms 106 contact sensors 120 and thus can complete a circuit or act as a reed switch so that sensors 120 can report on the locked or unlocked status of fastener 94.

Reference is now made to FIGS. 16 to 19. These illustrate a stud fastener which can be substituted for the ring clip fastener of FIGS. 12 to 15. The stud fastener of FIGS. 16 to 19 can be regarded as more robust and can carry a higher load compared to the ring fastener of the previous Figures.

Figure 18:
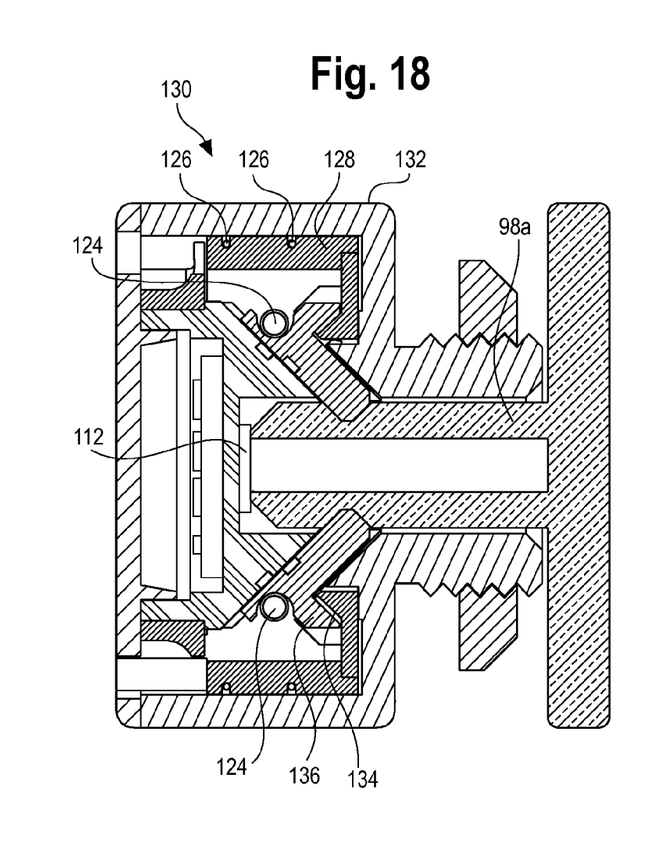
FIG. 18 is the same cross-sectional view as that in FIG. 17, but showing engagement of a peg.
Figure 19:
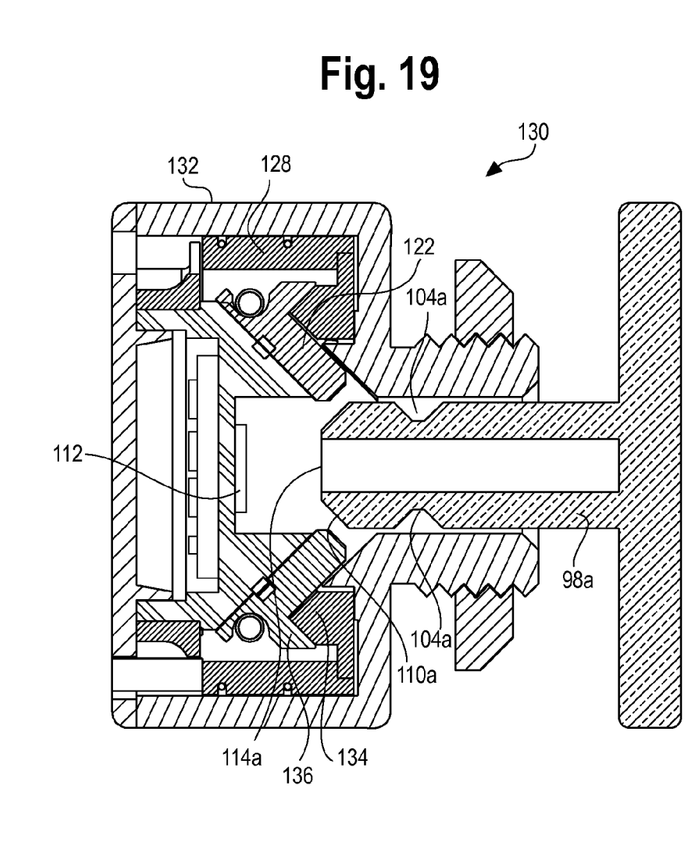
FIG. 19 is a cross-sectional view of the fastener of FIG. 16 in the unlocked state and is useful for comparison for FIG. 18.

Peg 98 of FIG. 10 is substituted by peg 98*a* shown in FIGS. 18 and 19.

Fastener 130 of FIGS. 16 to 19 has a plurality of teeth 122 adapted to engage groove 104*a* in peg 98*a*. Teeth 122 are biased towards the locked position by tension spring 124. Tension spring 124 also served to keep teeth 122 in position. Peg 98*a* can be pushed into fastener 130. Ramp 110*a* on peg 98*a* will push against teeth 122 and against the tension of spring 124. As peg 98*a* is pushed into fastener 130, teeth 122 will spring back into groove 104*a* to lock peg 98*a* into fastener 130.

As in the fastener of FIGS. 12 to 15, fastener 130 includes engagement sensor 112. When contacted by base 114*a* of peg 98*a*, engagement sensor 112 can report connection of peg 98*a* with fastener 130 and hence connection of instrumentation panel 90 in panel housing 92.

Fastener 130 includes shape memory alloy wires 126. These are wound around shuttle 128 which is rotatable within body 132 of fastener 130. Shape memory alloy wires 126 are fastened at each end to a non-rotatable part of fastener 130 (not illustrated). When shape memory alloy wires 126 are caused to contract by the application of suitable energy to reach the necessary temperature, shuttle 128 rotates to the position shown in FIG. 19. Shuttle 128 includes camming surface 134. As can be seen by FIG. 19, camming surface 134 ramps down on tail 136 of tooth 122, pushing tail 136 against the bias provided by tension spring 124 and drawing each tooth 122 out of engagement with groove 104*a*. Thus peg 98*a* is freed from fastener 130. Tension spring 124 may also bias shape memory alloy wires 126 to their relaxed configuration.

Figure 17:
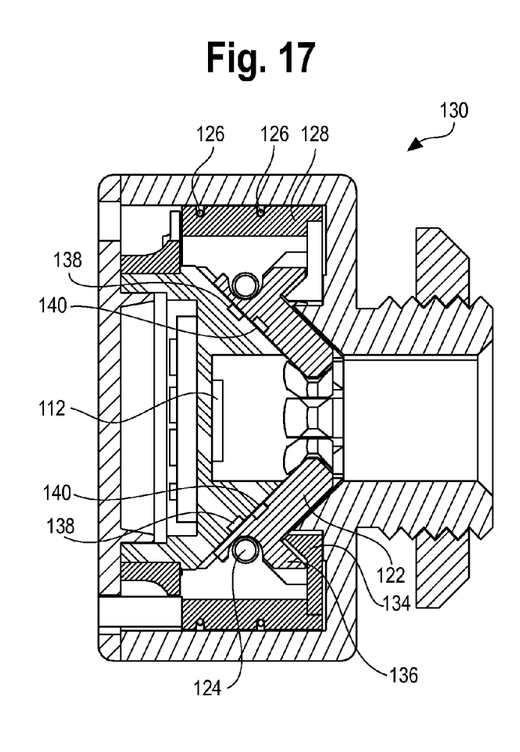
FIG. 17 is a cross-sectional view of the fastener of FIG. 16 in the locked state.

Included in fastener 130 are lock status sensors 138 and 140. When these are separated as shown in FIGS. 17 and 18, the sensors report that fastener 130 is in the locked state. When the sensors make contact, as shown in FIG. 19, the sensors report that fastener 130 is in the unlocked state. Sensors 138 and 140 may act as a reed switch, for example, or their contact may enable completion of an electrical circuit, to signal the unlocked state. Other configurations and means of sensing may of course be applicable.

Figure 20:
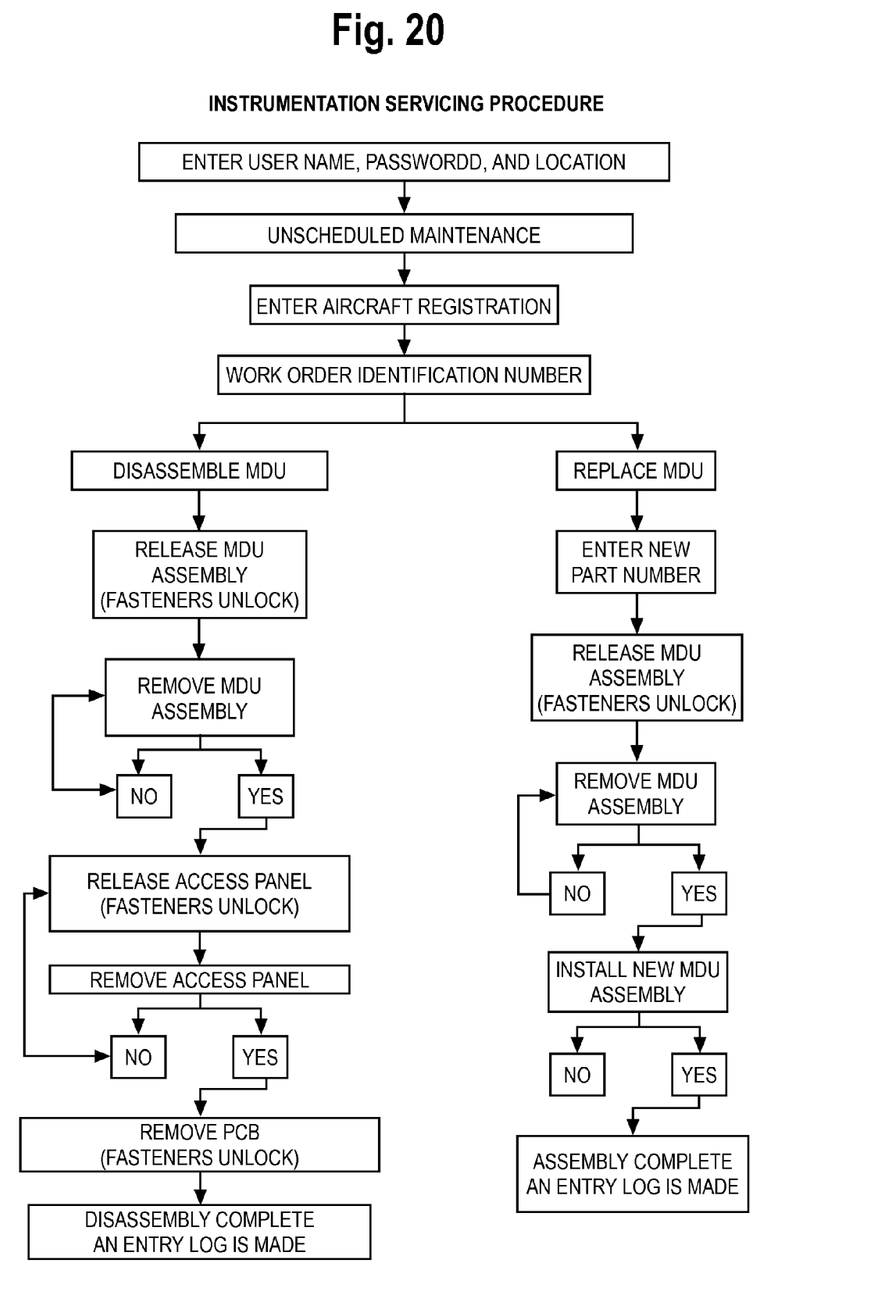
FIG. 20 is a schematic diagram of an instrumentation servicing procedure suitable for disassembly of the assembly in FIG. 9, using the fasteners of FIGS. 12 to 15 or of FIGS. 16 to 19.

Turning now to FIG. 20, this illustrates two alternate servicing procedures, which can be used in relation to the disassembly illustrated in FIGS. 9 to 11, and using the fastener of FIGS. 12 to 15 or the fastener of FIGS. 16 to 19. The servicing procedure described in connection with FIG. 20 contains many steps, such as password entry, etc., which are not essential to the invention but which may be highly desirable in an environment which requires high degrees of security and safety, such as the aircraft industry.

In FIG. 20, the servicing is in respect of a multiple display unit (MDU), such as instrumentation panel 90 in FIG. 9. Service is required as the MDU has some type of malfunction and needs to be serviced or replaced.

To commence the procedure, a service person, using a computer, enters the service person's user name, password and location in the computer. The computer may form part of the aircraft or may be a laptop plugged into an appropriate port in the aircraft, or may be a PDA computer communicating with the assembly by, for example, infrared or Blue tooth means.

The service person then enters such details as (in this case) that the maintenance is unscheduled, the aircraft registration number and a work order identification number.

Now, the service procedure follows the lefthand path or the righthand path in FIG. 20, depending on whether the MDU is to be serviced or replaced.

If the MDU is to be replaced, the righthand path is followed. The service person enters into the computer the option that the MDU is to be replaced and also enters the new part number of the replacement MDU. At this stage, the program may be set up to refuse to continue if the new part number does not indicate that the replacement MDU is a genuine part.

Provided the new part number is acceptable, the computer instructs the fasteners to unlock to release the MDU to be replaced. In the case of the fasteners in FIGS. 12 to 15 or FIGS. 16 to 19, the computer activates the shape memory alloy wires to contract, to enable release.

Next, the computer instructs the service person to remove the old MDU assembly. If the service person enters "No" or does not enter "Yes", the computer continues to instruct the service person to remove the old MDU assembly. If the service person enters "Yes", the computer checks that the old MDU assembly has in fact been removed, for example by receiving data from engagement sensor 112 in FIG. 18.

Next, the computer instructs the service person to install the new MDU assembly and asks that this is confirmed. Provided the service person enters "Yes", the computer checks that the MDU has in fact been assembled to panel housing 92, once again by receiving information from a sensor, such as sensor 112. Optionally, if the new MDU has embedded identification which can be read by the computer, the computer will compare the new part number entered at the beginning of the procedure with the actual part number on the new MDU and may reject the new MDU if there is not conformity (this option is not illustrated in FIG. 20).

The computer then records in a log that the MDU has been replaced together with the identification of the new MDU and the assembly is complete.

For servicing of an MDU without replacement, the left-hand path in FIG. 20 is followed. The service person selects the option "disassemble MDU" and the MDU assembly is released by the fasteners unlocking, as already described. The service person is instructed to remove the MDU assembly and to confirm, as before.

The MDU itself contains a printed circuitboard (PCB) which is retained behind an access panel (not illustrated in FIGS. 9 to 11). The procedure in relation to the removal of the access panels from the MDU is preferably carried out using a PDA which does not require hard wiring. However, the procedure can be adapted to hard wiring if required.

The service person instructs the computer to release the access panel at the rear of the MDU and the fasteners, which may be the same type of fasteners as those already illustrated, release this panel. The service person is instructed to remove the access panel and to confirm. The service person then instructs the computer to release the PCB. The computer can instruct fasteners, of the same type as described earlier, to release in order to allow the service person to remove the PCB.

At this stage, disassembly is complete and a log entry may be made. The PCB may be replaced and the procedure generally reversed to reassemble the MDU.

Industrial Applicability

The invention has wide industrial applicability, as will be readily apparent to one skilled in the art. As only one aspect of that industrial applicability, the invention enables tasks which are currently carried out by highly skilled personnel to be conducted safely and securely by less skilled personnel. This is readily appreciated by the instrumentation servicing procedure exemplified in FIG. 20.

The invention claimed is:

1. A method for assembling a component in an assembly, the method including the steps of:
    positioning the component in the assembly in accordance with a proposed position in the assembly;
    fastening the component to the assembly using a fastener, wherein the fastener has a first sensing means incorporated therein to sense whether the fastener is locked or unlocked;
    providing a sensing means capable of sensing spatial relationship of the component in relation to the assembly; and
    communicating information regarding the sensed spatial relationship and/or connection to information processing means.

2. The method of any one of claims 1 which includes the further step of displaying information communicated to the information processing means on information display means.

3. The method of any one of claims 2 wherein the information processing means is a computer.

* * * * *